United States Patent Office 2,895,612
Patented July 21, 1959

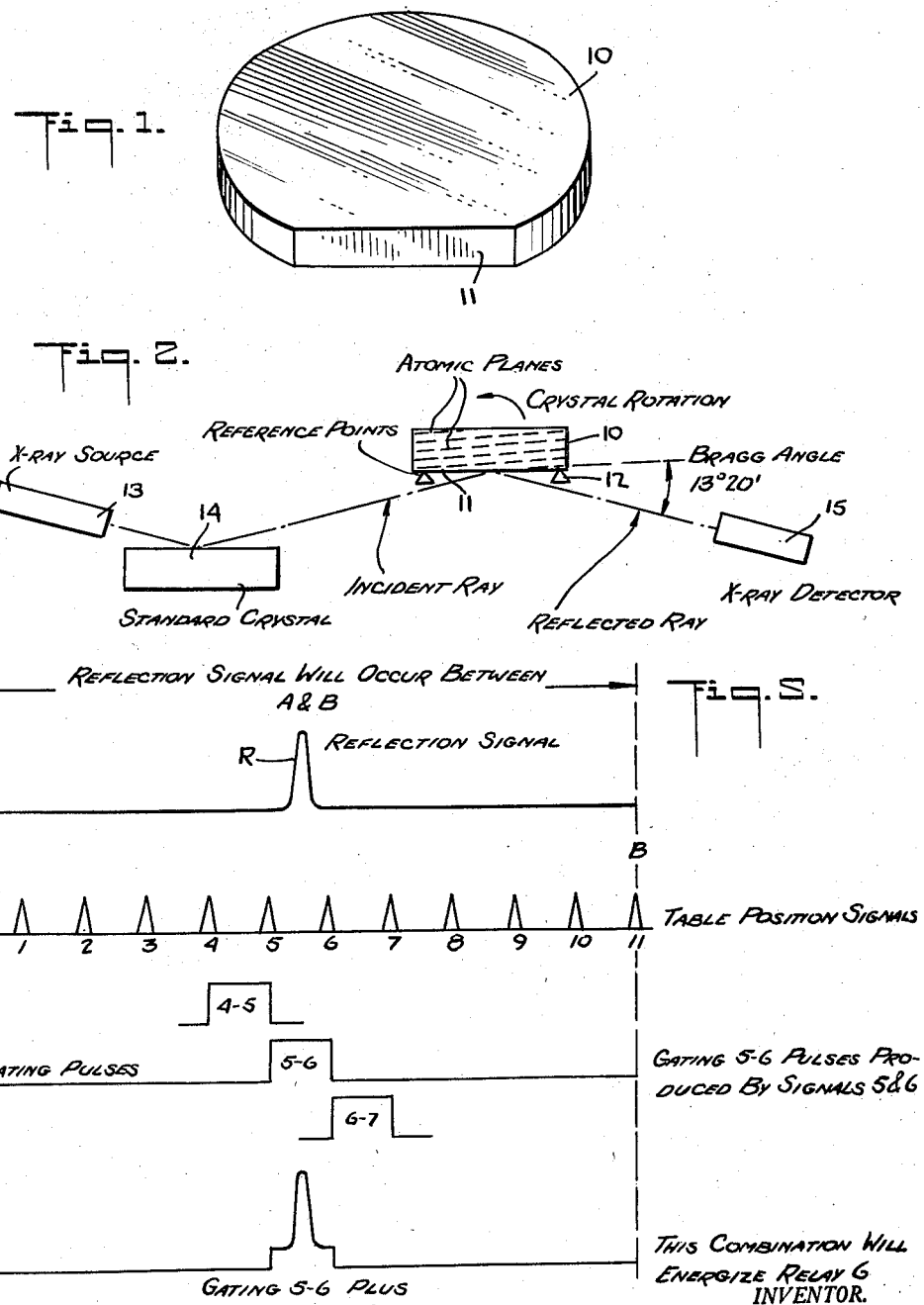

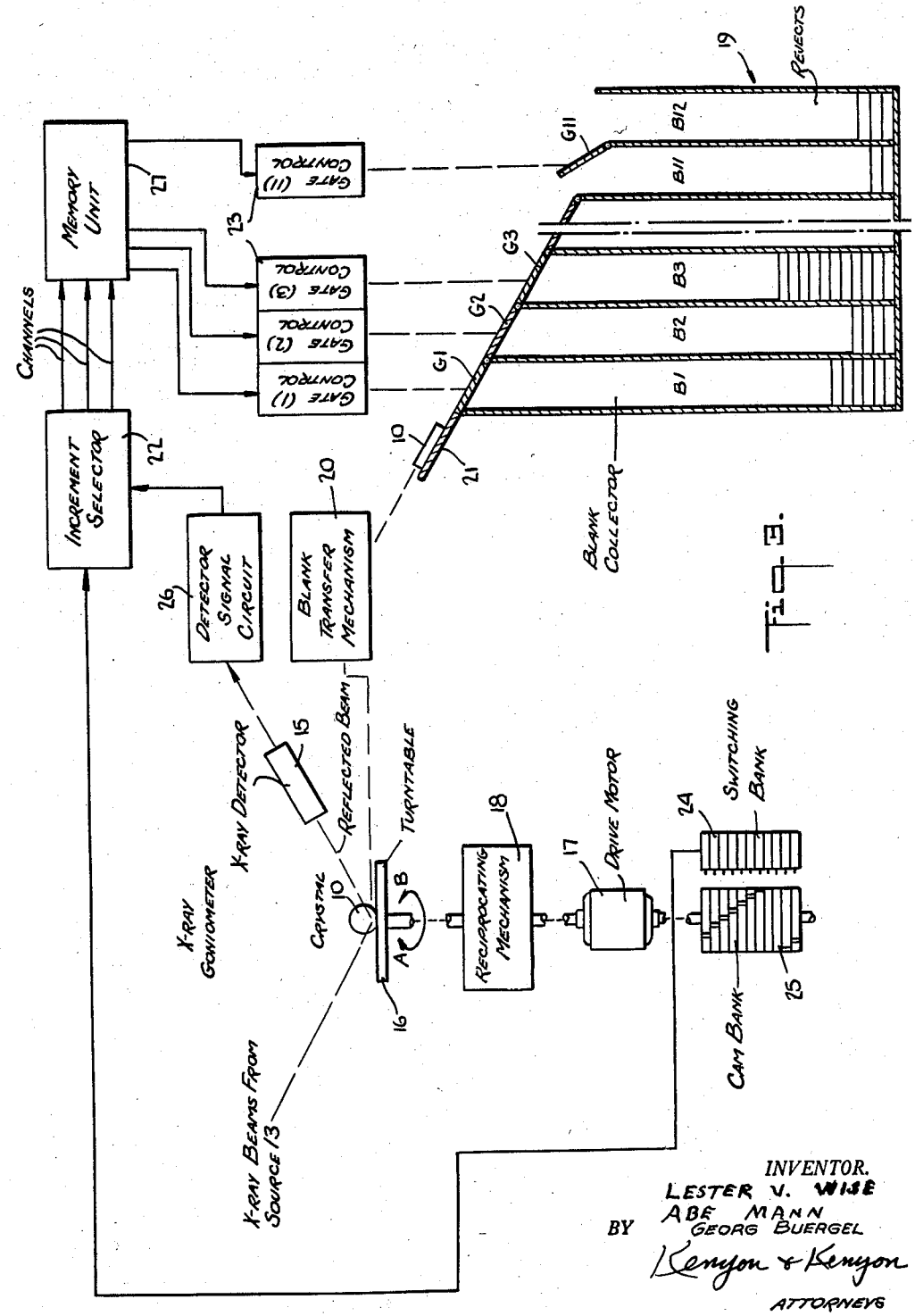

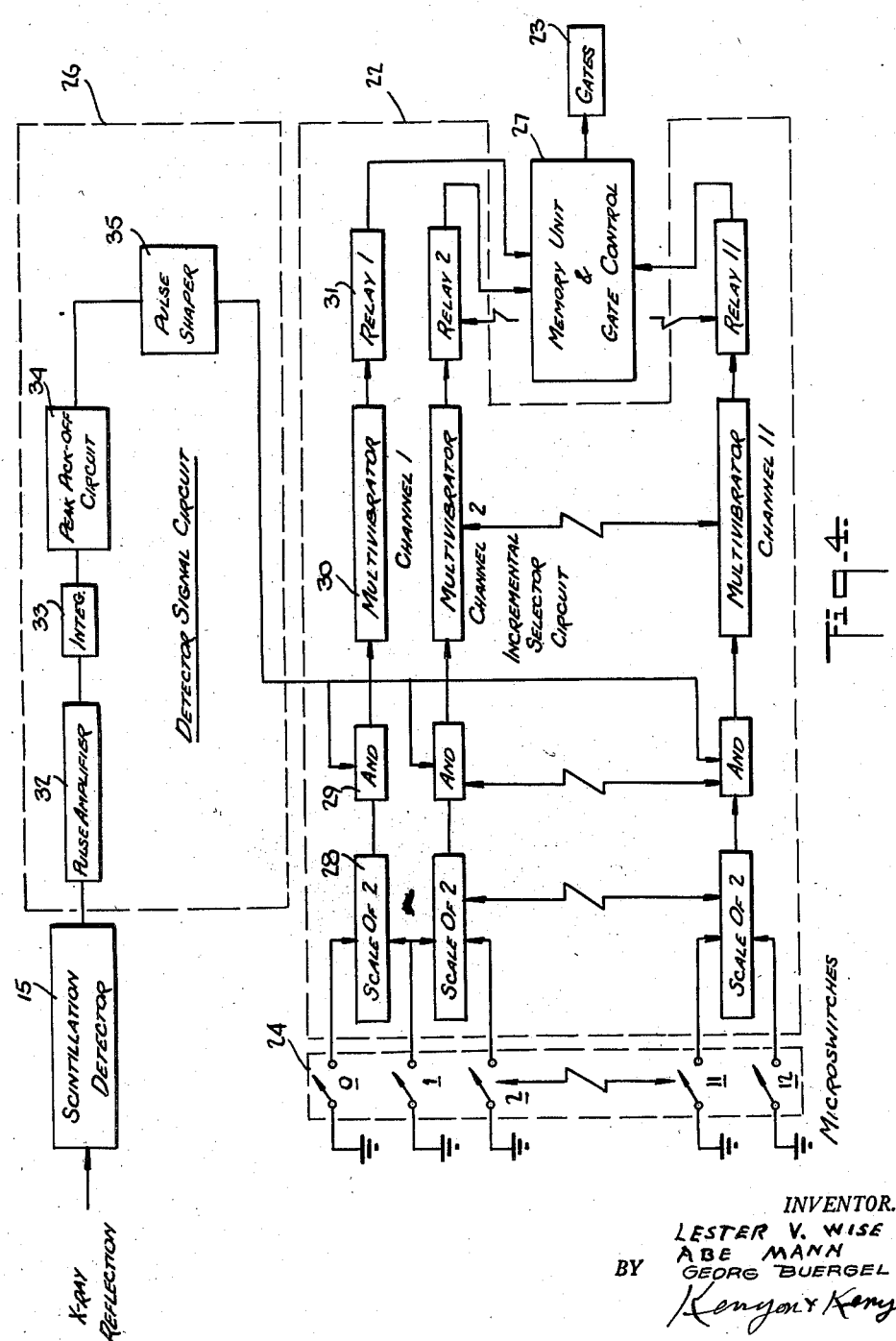

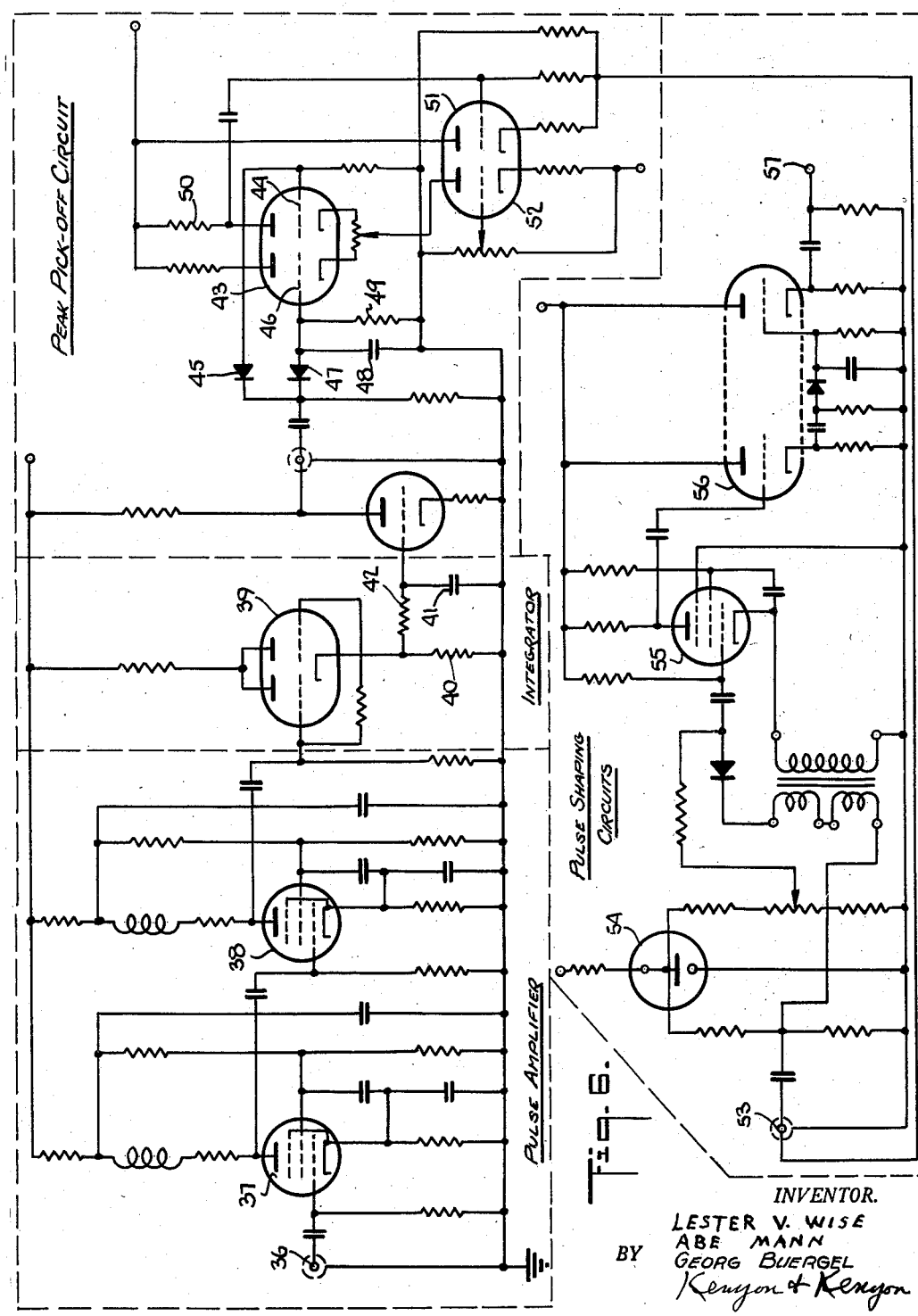

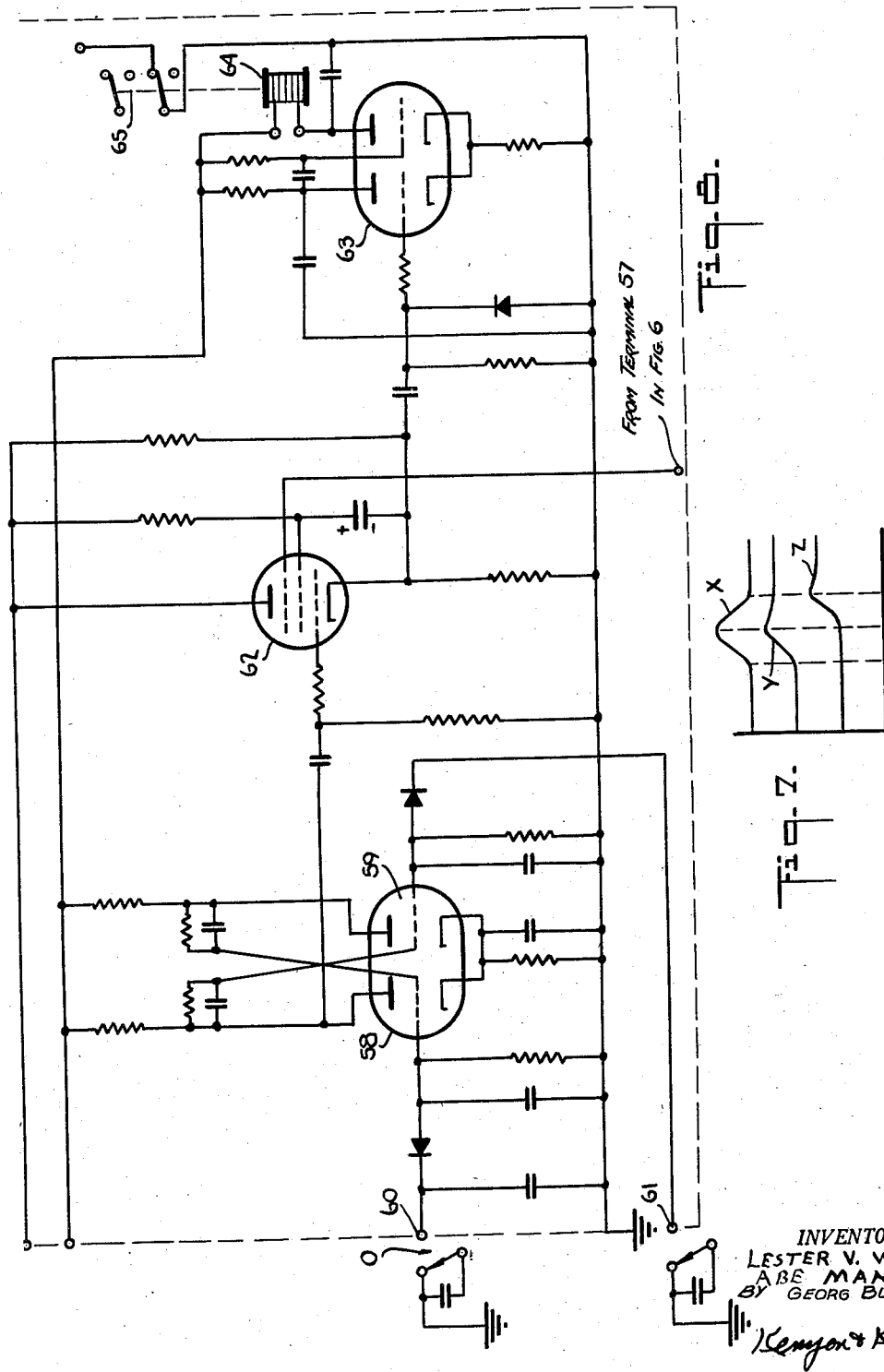

2,895,612

AUTOMATIC CRYSTAL MEASURING AND SORTING APPARATUS

Lester V. Wise, Plainview, Abe Mann, Uniondal, and Georg Buergel, Richmond Hill, N.Y., assignors to Bulova Research and Development Laboratories, Inc., Long Island, N.Y., a corporation of New York Application September 18, 1956, Serial No. 610,453

11 Claims. (Cl. 209—111)

The present invention relates generally to the manufacture of piezoelectric quartz crystal elements, and more particularly to automatic apparatus adapted to measure the axial orientation of crystal blanks and to sort the blanks according to the orientation measurements.

The use of piezoelectric quartz crystal units as frequency control elements in electronic systems is well known. A piezoelectric crystal undergoes a change in dimension or form proportional to an applied electrical potential and conversely generates a surface charge when subjected to stress. The crystal is said to be a piezoelectric resonator when the mechanical resonances of the crystal itself are used.

Crystal blanks for piezoelectric units are cut from quartz stones. The modes of motion and the properties of these modes depend markedly on how crystal plates are oriented relative to the natural crystal faces. The angle at which the crystal blank is cut with reference to the natural crystal axis determines the temperature coefficient of the frequency of the crystal unit. Obviously, to preclude or minimize departures from an assigned frequency as a result of temperature variations, it is essential that this coefficient be as close as possible to zero.

The Z or optic axis of a quartz crystal is along the longitudinal direction of the crystal, whereas the X axis extends through one of the apexes of the hexagon and the Y axis is normal to the other two. The Z—Z' angle, the angle defined by the Z axis and the crystal face, is especially significant as regards the temperature coefficient. For AT cuts the crystal plate is cut from a plane that is rotated about an X axis so that the angle made with the Z axis is approximately 35.5° (note, Terman —Radio Engineers' Handbook—1st Edition, 1943, page 490). There are of course many other useful crystal cuts involving different angles. This angle can be cut for any particular nominal frequency so that the temperature coefficient approaches zero. Thus the frequency of the unit will be stable throughout an extended temperature range, running for example from −55° C. to +90° C.

The Z—Z' crystal angle is highly critical. It is the current practice to cut the Z—Z' angle with diamond saws but the state of this art is not such that it is presently possible to control the angle with sufficient precision so as to produce all blanks within the desired angular specification. On the other hand, the Z—Z' angle can be chosen for any nominal frequency so that the temperature coefficient of frequency is close to zero. Consequently, given broad production requirements for blanks covering the entire frequency spectrum, no blank need be rejected. But since the blanks so cut are different, they must first be individually measured by X-ray diffraction techniques and then sorted into angular increments preparatory to final processing. Blanks from the proper incremental class will thereafter be selected for the fabrication of a group of crystals having a predetermined frequency.

In existing X-ray diffraction techniques for determining the angle between the face of a crystal and its atomic plane, an X-ray beam is directed at the face of the crystal and the blank is then rotated on a goniometer turntable. At solely one specific angle between the atomic plane of the crystal and the X-ray beam there will be X-ray reflection, this angle being known as the Bragg angle. To intercept the reflected beam as the face of the crystal lies against a reference surface, its position can be indicated electronically when the detector receives the signal, thereby establishing the Bragg angle.

In existing laboratory and industrial procedures, the X-ray measurement is carried out manually by peaking a signal output meter for maximum reflection and then reading a vernier position indicator mechanically coupled to the turntable to fix the crystal angle. This procedure is of course time-consuming and requires that the turntable be slowly swung in either direction until the peak position is found, the turntable movement then being arrested to enable the taking of the vernier reading. Thereupon the blank is removed from the turntable and placed into an appropriate group. Because of the skill entailed in making the X-ray measurements and the manual operations called upon both in determining the peak position of the crystal blanks and in thereafter sorting the blanks, this method does not lend itself to large scale mechanized production. Crystals are an important component in radio transmitters and in other electronic equipment and the drawbacks incident to conventional production techniques are a serious handicap when the need arises for a rapid build-up in crystal inventories as may be at times dictated by military necessity.

In view of the foregoing, it is the principal object of the invention to provide apparatus adapted automatically to measure by X-rays the axial orientation of crystal blanks and to sort the blanks automatically according to the orientation measurements.

More specificallly, it is an object of the invention to provide an automatic X-ray measuring and sorting device which gives an instantaneous and accurate reading of angular position while the crystal is in motion, and which stores this reading to enable automatic sorting of the crystal blanks into classes based on angular increments.

Still another object of the invention is to provide an X-ray sorter of greatly increased speed and efficiency, which eliminates the need for skilled operators and facilitates the mass production of crystals at a high rate.

Briefly stated, the X-ray sorter in accordance with the invention is constituted by an X-ray diffraction goniometer including a turntable for orientating the face of a crystal blank relative to an incident X-ray beam whereby at a given angular position of the turntable the beam is reflected at the atomic plane of the blank and thereby intercepted by an X-ray detector to produce an output signal. The turntable is reciprocated or rocked about its central axis through a limited sector whereby in the course of one arcuate stroke or sweep of the turntable a signal is produced having a peak whose instantaneous time position lies within a time period corresponding to the angular sweep of the turntable and coincides with the angular point at which X-ray reflection occurs.

A crystal blank collector is provided having a plurality of slots or bins each intended to receive only blanks whose measured angles fall within a given angular increment of the sector swept by the goniometer, a respective bin being furnished for each increment of the sector. An entrance gate is provided for each bin. Operating in conjunction with the blank collector is transfer and discharge mechanism adapted to transfer the measured blank from the turntable to the blank collector, the crystal being admitted to the bin whose gate is open. The opening of the gates for the bins is controlled by an increment selector. The selector is responsive to the output signal from the X-ray detector and is governed by the angular position of the turntable whereby only that gate is opened which gives access to a bin intended for the particular angular increment in the sweep in which the reflecting signal peak appears.

In a preferred embodiment of the invention the increment selector is constituted by a multi-channel circuit, the number of channels being equal to the number of increments. The channels act to operate a control device in a memory circuit, which control device is adapted to open or close a respective gate in the blank collector. The channels are normally inactive, but are sequentially conditioned or prepared for actuation by a switching device coupled to the sweep mechanism for the turntable whereby each channel is conditioned for a respective incremental angular span in the course of the sector scan. Applied to the several channels is the signal from the detector such that only that channel is rendered active whose angular increment comprehends the peak of the signal. Thus when the measured blank is transferred to the collector, the appropriate gate is opened and as the X-ray sorter continues to operate, the various bins fill up with blanks sorted into incremental groups, thereby facilitating further processing.

For a better understanding of the invention, as well as other objects and further features thereof, reference is had to the following detailed description to be read in conjunction with the accompanying drawing wherein like components in the several views are identified by like reference numerals.

In the drawings:

Fig. 1 is a perspective view of the crystal blank.

Fig. 2 is a schematic diagram showing an X-ray goniometer arrangement for measuring the Bragg angle of the crystal blank.

Fig. 3 is a schematic diagram illustrating the general organization of the X-ray measuring and sorter apparatus.

Fig. 4 is a block diagram of the detector signal and incremental selector circuits.

Fig. 5 is a waveform illustrative of the operation of the circuit shown in Fig. 4.

Fig. 6 is a schematic circuit diagram of the detector signal circuit.

Fig. 7 is a waveform illustrative of the operation of the peak pick-off circuit of Fig. 6.

Fig. 8 is a schematic diagram of the incremental selector circuit.

Referring now to the drawings and more particularly to Fig. 1, the blank 10, after being cut by a diamond saw or other known means from the quartz stone, is disc-shaped but with a peripheral flat 11. This flat facilitates proper orientation of the blank in the intermediate production process disclosed herein as well as in subsequent processes entailed in finishing the unit.

As pointed out previously, stones used as raw material have natural crystal axes. The crystal blank must be cut from the stone with accurate orientation relative to these axes to obtain the desired characteristics in the completed finished unit. The Z—Z' angle is especially critical as to temperature frequency characteristics. It is to be understood, however, that the invention is by no means limited to this cut and may be used successfully with any other desired cut. In practice the blanks may come in two diameters .375" and .490" and range in thickness from .020 to .035". The automatic X-ray sorter can be made to accommodate either diameter. It is to be understood that the invention is by no means limited to the particular blank shape or sizes illustrated herein. For example, the invention is also operable with square-shaped blanks. All that is required is that the blank has some reference surface.

At the measurement position, the crystal blank in accordance with the invention is placed in a double crystal goniometer operating on the well-known principles of X-ray diffraction as shown in Fig. 2. The crystal 10 is mounted on a turntable with the orientation flat 11 resting on a reference surface. The face of the crystal rests against a reference surface represented by points 12. The crystal is then rocked or oscillated through a small sector about the axis of the turntable so that the orientation reading can be made.

A high intensity X-ray beam from a suitable tube 13 preferably energized by a constant direct-current high voltage source, is directed at a standard crystal 14 which projects a well collimated beam toward the face of the crystal being measured. This causes reflection from the crystal under test to a scintillation counter 15 to be very sharp, about one minute of arc, thereby affording a measurement of high accuracy. Such reflection will occur at only one specific angle of incidence of the beam on the atomic plane in the crystal, the so-called Bragg angle. Inasmuch as the face of the crystal is located against a reference point, its position can be determined electronically when the detector picks up the signal. The manner in which this is effected instantaneously without arresting the movement of the turntable will be later described.

Fig. 3 is a general schematic diagram of the X-ray sorter in accordance with the invention and includes a goniometer turntable 16 which is driven by a motor 17 through a suitable reciprocating mechanism 18 which causes the turntable to rock back and forth through a small angle so that an orientation reading can be made. The X-ray sorter may be loaded by hand by placing the crystal blank on the turntable or loading may be effected automatically from a suitable cartridge dispenser.

The arcuate distance A—B represents the sweep of the oscillating table within a limited sector. By way of illustration, the sector A—B shall be said to represent 22 minutes of arc and a time period of 0.44 seconds. The instantaneous angular position of the reflection signal produced by the X-ray detector at a point between A and B is indicative of the crystal angle to be measured. The function of the sorting apparatus is to classify the various crystals being measured into distinct groups each encompassing blanks falling within a given angular increment.

By way of example, we shall divide the blanks into eleven groups each representing an increment of 2 minutes. Thus if the reflection signal from a blank being measured were to occur within two minutes of the extremity A in the arc, the blank would fall into the first class, but if the reflection signal were to occur within two minutes of B, it would fall into the last of the eleven classes, whereas if the signal were to arise at some intermediate point between A and B, the blank would then fall into an appropriate intermediate class. It is to be understood that the increments need not be of like width and that the orientation of the scanning sector relative to the X-ray beam may be adjusted as desired.

Since we are to sort the blanks into 11 groups, the blank collector 19 is constituted by 11 slots or bins B1 to B11, each intended to receive blanks whose measured angles fall within a given angular increment of the sector A—B swept by the goniometer, a separate bin being furnished for each increment. Entrance gates G1 to G11 are provided for the bins which, when open, admit blanks into the associated bins. A twelfth bin B12 may be provided to receive rejects not acceptable in any of the eleven bins, this bin being always open.

After a blank has been measured in the goniometer, a suitable transfer mechanism 20, which may be in the form of a vacuum chuck, acts to remove the blank from the turntable and to discharge it into the collector for insertion in an appropriate bin. This may be accomplished by means of an inclined chute or slide 21 on which the previously measured blank is deposited, the blank sliding down the chute until it arrives at an open gate, at which point it drops into the bin below.

For the purpose of opening the appropriate gate in the blank collector 19, an increment selector 22 is provided which is responsive to the angular position of the reflection signal within the test arc and selectively actuates gate control mechanisms 23 operating the gates G1 and G2. The selector is constituted by as many independent control channels as there are gates, each channel being normally inactive. The channels are successively conditioned, prepared or gated for actuation by means of a switching mechanism 24 including a series of microswitches whose operation is synchronized with the movement of the turntable. This is accomplished by means of a cam assembly 25 mechanically coupled to the drive motor 17 and engaging the microswitches in mechanism 24 whereby as the turntable sweeps through sector A—B (22 minutes of arc in 0.44 seconds), the microswitches operate in sequence to produce table position signals marking the incremental intervals. In other words, at the beginning and end of each two minutes of arc, a table position signal is generated, the time interval between signals in the example herein being 0.04 second. It is to be understood that the size and number of the increments is not important to the invention.

The angular position signals from the microswitch, as will be explained in greater detail in connection with Fig. 4, are applied to the respective channels in the selector to condition each channel for actuation for a respective increment of the total sweep interval. Consequently, in this example, in terms of time each channel is conditioned for actuation for a 0.04 second interval.

Supplied to all of the channels is the reflection signal obtained from the detector in the course of the sector scan. The pulses from X-ray detector 15 are applied to a detector signal circuit 26 wherein the pulses are amplified and integrated to obtain a continuous voltage, this voltage being fed to a peak pick-off circuit to produce an output pulse at the peak of the reflected signal, and hence the exact angular position at which X-ray reflection is obtained. The instantaneous position of the output pulse will fall within only one of the angular increments during which the channels in the selector are conditioned to operate. The selector channels are so arranged as to render that particular channel active and no other channel. A memory circuit 27 is coupled to the increment selector 22 and acts to hold or store the selection until such time as the crystal has been positioned for sorting. While the next crystal undergoes measurement, the memory unit reads off into the gate control circuits 23 to open the correct gate for receiving the previously measured crystal blank.

Referring now to Fig. 4, the detector signal circuit 26, the incremental selector circuit 22 and the associated switching bank 24 are shown in greater detail. As pointed out previously, the selector is constituted by 11 identical and independent channels. Each channel, as illustrated in Fig. 4, is made up of a "Scale of Two" circuit 28 whose rectangular pulse output in response to two input pulses is applied to an "And" or coincidence circuit 29 which operates only when two input pulses are simultaneously present. The "And" circuit 29 in turn triggers a multivibrator 30 to provide a pulse for energizing an output relay 31. The operation of the relay in a given channel actuates a corresponding relay in the memory unit 27, which actuation is held for the next cycle of the machine and then energizes the gate solenoid to operate the appropriate collector gate 23.

The detector signal circuit 26 to which the output of the scintillation detector 15 is applied is constituted by an amplifier 32 followed by integrating circuit 33 which converts the pulses generated in the scintillation detector in response to X-radiation to a voltage whose amplitude substantially is a function of the pulse repetition rate. This voltage is impressed on a peak pick-off circuit 34 which develops a pulse initiated at the time corresponding to the point of maximum output from the detector 15. This pulse is applied through a pulse shaper 35 to one input of the "And" circuit 29 in all of the selector channels, the pulse shaper acting to form an extremely sharp triggering pulse.

The cam-operated microswitches 24 are twelve in number, 0 to 11, the switches operating in sequence under the control of the turntable drive mechanism 17 at instants marking the beginning and end of an increment in the measuring arc. These marks or table position signals are illustrated in Fig. 5 as a train of equi-spaced pips numbered from 0 to 11 extending between the angular extremities A and B of the sweep. The reflection signal is represented by a pulse R whose angular position falls between the pips 5 and 6 in the table position signals.

Microswitches 0 and 1 are connected to the input of the first "Scale of Two" circuit 28, switches 1 and 2 are connected to the input of the second "Scale of Two" circuit, etc., such that in operation, the sequential closing of switches 0 and 1 produces a rectangular output pulse in the first "Scale of Two" circuit whose width is determined by the time spacing between the closings, and the remaining "Scale of Two" circuits are successively operated in the same manner to produce an uninterrupted series of gating pulses. The gating pulses resulting from the sequential operations of the switches 4—5, 5—6 and 6—7 are illustrated in Fig. 5 and it will be seen that the reflection signal R has an angular position falling within gating pulse 5—6.

The "And" circuit 29 in the sixth channel will be the only circuit energized in the sweep period between A and B since the gating pulse 5—6 applied thereto and the reflection signal R are coincident, thereby operating the output relay in the sixth channel, as a consequence of which the sixth gate in the collector is opened to receive the measured blank therein.

The schematic arrangement for the detector signal circuit 26 is shown in Fig. 6. The pulses from the scintillation counter are applied to input terminal 36 of a two-stage pulse amplifier including electron tubes 37 and 38, the output of the amplifier being fed to a cathode follower including dual triode tube 39 whose output is developed across a cathode resistor 40. Cathode resistor 40 is connected in an integrating circuit constituted by condenser 41 connected in series with resistor 42 across resistor 40 to produce a voltage whose amplitude represents the repetition rate of the pulses from the X-ray detector, this voltage being graphically indicated in Fig. 7 by wave form X. It will be appreciated that the peak of wave X represents the angular position at which reflection occurs from the crystal blank.

The voltage X is applied to a peak pick-off circuit including a differential amplifier dual triode tube 43, the voltage X being applied to the grid 44 of one tube section through a diode element 45. The voltage X is also applied to the grid 46 of the other tube section through a diode 47, the grid circuit including a charging capacitor 48 whereby the waveform of the voltage in the circuit of grid 46 takes the form indicated by Y in Fig. 7.

It will be seen that the voltage rises during the charge of the condenser to a maximum point corresponding in time with the peak of the voltage X, and then falls slowly during the subsequent discharge of the condenser across a resistor 49 shunted thereacross. Since voltages X and Y are applied to the differential amplifier tube 43, the algebraic resultant is represented by voltage Z which is at zero value until at the peak of X and Y it rises. This rise thus starts at the peak of signal X and is later used to produce the triggering pulse. From the foregoing it is evident that the peak pick-off circuit is characterized by the ability to identify the position of a peak in a voltage wave, regardless of the amplitude or shape of the wave.

Voltage Z is developed across resistor 50 and is applied to a cathode follower including one section 51 of a dual triode tube, the other section 52 thereof acting as a high impedance load in the cathode circuit of the differential amplifier 43.

The output of the cathode follower is fed to the input terminal 53 of a voltage regulator tube 54, whose output is connected to a device including tube 55 which is an amplitude sensitive pulse circuit providing a sharp output pulse at the moment voltage Z begins to rise. The output pulse is applied to a cathode follower including tube 56 whose output appears at terminal 57 for application as a triggering pulse to the "And" circuit in Fig. 8.

Referring now to Fig. 8, the incremental channel selector comprises eleven channels, each of which includes a scale of 2 circuit in the form of a bi-stable multivibrator having a pair of triodes 58 and 59. The two microswitches from the switch assembly 24 (Fig. 4) are connected respectively between the terminals 60 and 61 and ground, which terminals are coupled to the grids of tubes 58 and 59. Thus the closing of the switch connected to terminal 60 generates a pulse to render tube 58 conductive and the closing of the switch connected to terminal 61 similarly generates a pulse to render tube 59 conductive. These successive actions produce a square wave gating pulse whose width corresponds to the period between switch closings.

The square wave gating pulse from the "Scale of Two" circuit is applied to one grid of an "And" circuit or coincidence tube 62, the output reflected signal pulse from terminal 57 of the pulse holding circuit being applied to another grid thereof. Coincidence circuit tube 62 is rendered conductive only when both the gating pulse and the reflected signal pulse are simultaneously present to produce an output pulse which triggers a multivibrator 63 whose output circuit includes a relay 64, the relay contacts 65 acting to operate a relay or other device in a memory circuit to store the information applied thereto and thereafter operate the appropriate gate in the blank collector.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Apparatus for automatically measuring the axial orientation of crystal blanks and to sort the blanks according to the orientation measurements, said apparatus comprising an X-ray diffraction goniometer including a turntable adapted to orient a crystal blank within a given sector relative to an incident X-ray beam to produce an output signal at the angular position of the turntable at which reflection occurs, means to reciprocate said turntable within said sector whereby in the course of one arcuate sweep of the turntable an output signal is produced at the angular position at which reflection occurs, a crystal blank collector provided with a plurality of bins each intended to receive only blanks whose measured angles fall within a given angular increment of the sector swept by said turntable, each bin having a normally closed entrance gate, means to transfer a measured blank from said goniometer to said collector, and means responsive to said signal and governed by the angular position of the turntable to open the appropriate gate in said collector intended for the particular angular increment in which the signals appears to admit the transferred blank therein.

2. Apparatus for automatically measuring the axial orientation of crystal blanks and to sort the blanks according to the orientation measurements, said apparatus comprising an X-ray diffraction goniometer including a turntable adapted to orient a crystal blank within a given sector relative to an incident X-ray beam, and an X-ray detector to produce an output signal at the angular position of the turntable at which reflection occurs, means to reciprocate said turntable within said sector whereby in the course of one arcuate sweep of the turntable an output signal is produced at the angular position at which reflection occurs, a crystal blank collector provided with a plurality of bins each intended to receive only blanks whose measured angles fall within a given angular increment of the sector swept by said turntable, each bin having a normally closed entrance gate, means to transfer a measured blank from said goniometer to said collector and increment selector means responsive to said signal and governed by the angular position of the turntable to open the appropriate gate in said collector so as to admit the transferred blank therein.

3. Apparatus for automatically measuring the axial orientation of crystal blanks and to sort the blanks according to the orientation measurements, said apparatus comprising an X-ray diffraction goniometer including a turntable adapted to orient a crystal blank within a given sector relative to an incident X-ray beam to produce an output signal at the angular position of the turntable at which reflection occurs, means to reciprocate said turntable within said sector whereby in the course of one arcuate sweep of the turntable an output signal is produced at the angular position at which reflection occurs, a crystal blank collector provided with a plurality of bins each intended to receive only blanks whose measured angles fall within a given angular increment of the sector swept by said turntable, each bin in said plurality having a normally closed entrance gate, an additional normally open bin to receive blanks whose measurement is outside said range, means to transfer a measured blank from said goniometer to said collector, and means responsive to said signal and governed by the angular position of the turntable to open the appropriate gate in said collector intended for the particular angular increment in which the signal appears to admit the transferred blank therein, said transferred blank when no gate is open falling into said additional bin.

4. Apparatus for automatically measuring the axial orientation of piezoelectric crystal blanks and to sort the blanks according to the orientation measurement, said apparatus comprising an X-ray diffraction gonimeter including a turntable for orienting the face of a crystal to be measured relative to an incident X-ray beam whereby at a particular angular position of the turntable the beam is reflected at the atomic plane of the blank, an X-ray detector to intercept the reflected beam and thereby to produce an output signal and means to reciprocate said turntable within a given sector whereby in the course of one arcuate sweep of the turntable an output signal is produced at that angular position at which reflection occurs; a crystal blank collector including a plurality of normally closed channels each intended for blanks whose measured angles fall within a given angular increment of the sector swept by the turntable; a transfer mechanism for conveying the measured blank from the turntable to the blank collector for admission to the appropriate channel; and means responsive to said signal and governed by the angular position of the turntable to open only that channel intended for the particular angular increment in the sweep in which the signal appears whereby said blank is received therein.

5. Apparatus for automatically measuring the axial orientation of piezoelectric crystal blanks and to sort the blanks according to the orientation measurement, said apparatus comprising an X-ray diffraction goniometer including a turntable for orienting the face of a crystal to be measured relative to an incident X-ray beam whereby at a particular angular position of the turntable the beam is reflected at the atomic plane of the blank, an X-ray detector to intercept the reflected beam thereby to produce an output signal and means to reciprocate said turntable within a given sector whereby in the course of one arcuate sweep of the turntable a signal is produced at that angular position at which reflection occurs; a crystal blank collector including a plurality of bins each intended for blanks whose measured angles fall within a given angular increment of the sector swept by the turntable, and a normally closed entrance gate for each bin; a transfer mechanism for conveying the measured blank from the turntable to the blank collector for admission to the appropriate bin; and an increment selector responsive to said signals and governed by the angular position of the turntable to effect opening of that gate giving access to the bin intended for the particular angular increment in the sweep in which the signal appears.

6. Apparatus for automatically measuring the axial orientation of piezoelectric crystal blanks and to sort the blanks according to the orientation measurement, said apparatus comprising an X-ray diffraction goniometer including a turntable for orienting the face of a crystal to be measured relative to an incident X-ray beam whereby at a particular angular position of the turntable the beam is reflected at the atomic plane of the blank, an X-ray detector to intercept the reflected beam thereby to produce an output signal and means to reciprocate said turntable within a given sector whereby in the course of one arcuate sweep of the turntable a signal is produced at that angular position at which reflection occurs; a crystal blank collector including a plurality of bins each intended for blanks whose measured angles fall within a given angular increment of the sector swept by the turntable, and a normally-closed entrance gate for each bin; a transfer mechanism for conveying the measured blank from the turntable to the blank collector for admission to the appropriate bin; and an increment selector responsive to said signal and governed by the angular position of the turntable to effect opening of that gate giving access to the bin intended for the particular angular increment in the sweep in which the signal appears, said increment selector including a plurality of normally inoperative channels equal in number to the number of increments, and means to condition said channels for actuation sequentially for a respective increment in said sweep whereby only that channel is rendered operative whose angular increment comprehends the signal applied thereto.

7. Apparatus, as set forth in claim 6, wherein said means sequentially to condition said channels of said selector is constituted by a bank of switches coupled to said channels, and a cam mechanism operatively coupled to said turntable and arranged sequentially to actuate said switches.

8. Apparatus for automatically measuring the axial orientation of piezoelectric crystal blanks and to sort the blanks according to the orientation measurement, said apparatus comprising an X-ray diffraction goniometer including a turntable for orienting the face of a crystal to be measured relative to an incident X-ray beam whereby at a particular angular position of the turntable the beam is reflected at the atomic plane of the blank, an X-ray detector to intercept the reflected beam thereby to produce an output signal and means to reciprocate said turntable within a given sector whereby in the course of one arcuate sweep of the turntable a signal is produced at that angular position at which reflection occurs; a crystal blank collector including a plurality of bins each intended for blanks whose measured angles fall within a given angular increment of the sector swept by the turntable, and a normally closed entrance gate for each bin; a transfer mechanism for conveying the measured blank from the turntable to the blank collector for admission to the appropriate bin; a peak holding circuit coupled to said detector to produce a pulse at a time corresponding to the peak of the output signal; and an increment selector responsive to said pulse and governed by the angular position of the turntable to effect opening of that gate giving access to the bin intended for the particular angular increment in the sweep in which the signal appears.

9. Apparatus for automatically measuring the axial orientation of piezoelectric crystal blanks and to sort the blanks according to the orientation measurement, said apparatus comprising an X-ray diffraction goniometer including a turntable for orienting the face of a crystal to be measured relative to an incident X-ray beam whereby at a particular angular position of the turntable the beam is reflected at the atomic plane of the blank, an X-ray detector to intercept the reflected beam thereby to produce an output signal and means to reciprocate said turntable within a given sector whereby in the course of one arcuate sweep of the turntable a signal is produced at that angular position at which reflection occurs; a crystal blank collector including a plurality of bins each intended for blanks whose measured angles fall within a given angular increment of the sector swept by the turntable; and a normally closed entrance gate for each bin; a transfer mechanism for conveying the measured blank from the turntable to the blank collector for admission to the appropriate bin; a peak holding circuit coupled to said detector to produce a pulse at a time corresponding to the peak of the output signal; an increment selector responsive to said pulse and governed by the angular position of the turntable to effect opening of that gate giving access to the bin intended for the particular angular increment in the sweep in which the signal appears; and a memory circuit interposed between said selector and said gates to hold the selection for a complete cycle of the turntable before opening the appropriate gate.

10. Apparatus for automatically measuring the angle between the face of a piezoelectric crystal blank and its atomic plane and to sort the measured blanks according to their orientation, said apparatus comprising an X-ray diffraction goniometer including a turntable for orienting the face of a crystal to be measured relative to an incident X-ray beam whereby at the Bragg angle position of the turntable the beam is reflected, an X-ray detector oriented to intercept the reflected beam thereby to produce an output signal, and motor means to reciprocate said turntable within a given sector whereby in the course of one arcuate sweep of the turntable a signal is produced at that angular position at which reflection occurs; a crystal blank collector including a plurality of bins each intended for blanks whose measured angles fall within a given angular increment of the sector swept by the turntable, a normally closed entrance gate for each bin and an inclined slide on which said gates are arranged whereby a blank deposited on top of said slide will move downwardly thereon until intercepted by an open gate; a transfer mechanism for conveying the measured blank from the turntable to the top of the slide on the blank collector for admission to the appropriate bin; and an increment selector responsive to said signal and governed by the angular position of the turntable to effect opening of that gate giving access to the bin intended for the particular angular increment in the sweep in which the signal appears.

11. In an apparatus for automatically measuring the axial orientation of crystal blanks, an X-ray diffraction goniometer including a turntable for orienting the face of a crystal to be measured relative to an incident X-ray beam whereby at a particular angular position of the turntable the beam is reflected at the atomic plane of the blank, an X-ray detector to intercept the reflected beam thereby to produce an output signal, means to reciprocate said turntable within a given sector whereby in the course of one arcuate sweep of the turntable a signal is produced at the angular position at which reflection occurs, and means responsive to said signal and governed by the movement of said turntable to indicate the angular increment in said sector at which said signal occurs.

References Cited in the file of this patent

UNITED STATES PATENTS

| | | |
|---|---|---|
| 1,722,751 | Jones | July 30, 1929 |
| 1,874,069 | Weigi | Aug. 30, 1932 |
| 2,679,317 | Roop | May 25, 1954 |